United States Patent [19]

Lee

[11] Patent Number: 5,439,429
[45] Date of Patent: Aug. 8, 1995

[54] VEHICLE SAFETY SYSTEM FOR CORRECTING SIMULTANEOUS ACTUATION OF BRAKE AND ACCELERATOR PEDALS

[76] Inventor: Steven P. Lee, 25 - 5th St., N. Arlington, N.J. 07031

[21] Appl. No.: 155,820

[22] Filed: Nov. 23, 1993

[51] Int. Cl.⁶ .............................................. B60K 41/20
[52] U.S. Cl. ..................................... 477/207; 477/205
[58] Field of Search ................ 477/205, 206, 207, 203

[56] References Cited

U.S. PATENT DOCUMENTS

| | | | |
|---|---|---|---|
| 1,986,461 | 1/1935 | Bellis | 477/206 X |
| 2,066,667 | 1/1937 | Bellis | 477/203 X |
| 2,831,555 | 4/1958 | Strauss | 477/207 |
| 2,982,382 | 5/1961 | Strauss | 477/207 |
| 3,495,692 | 2/1970 | Holgate | 477/207 |
| 3,580,370 | 5/1971 | McCammon | 477/207 |
| 3,722,491 | 3/1973 | Maeda | 477/206 X |
| 3,750,780 | 8/1973 | Danek | 477/206 |
| 4,273,211 | 6/1981 | Sarmiento | |
| 4,946,012 | 8/1990 | Foster | 477/206 |
| 5,193,640 | 3/1993 | Lee | |

FOREIGN PATENT DOCUMENTS 1927960  12/1970  Germany ........................... 477/205

Primary Examiner—Rodney H. Bonck
Attorney, Agent, or Firm—Birch, Stewart, Kolasch & Birch

[57] ABSTRACT

A vehicle safety system includes a tube engagement for tightly engaging with a shaft engagement, a rotatable shaft having a throttle valve, a tube for slidably receiving the rotatable shaft, and accelerator and brake pedals connected to the tube engagement and the tube, respectively, for correcting simultaneous actuation of the accelerator and brake pedals.

2 Claims, 2 Drawing Sheets

VEHICLE SAFETY SYSTEM FOR CORRECTING SIMULTANEOUS ACTUATION OF BRAKE AND ACCELERATOR PEDALS

BACKGROUND OF THE INVENTION

1. Field of the Invention

The present invention relates to a vehicle safety system for correcting simultaneous actuation of the brake and accelerator pedals. More particularly, the present invention relates to a vehicle safety apparatus for correcting when a vehicle driver depresses the accelerator pedal during the vehicle driver's brake pedal application.

2. Description of Related Art

There have been a number of unintended accelerations of motor vehicles, resulting in property damages, injuries, even death, and subsequent liability suits. The accidents have been reported as a misapplication of the accelerator pedal instead of the brake pedal in a vehicle.

Several types of vehicle safety systems are known in the art. In general, as shown in FIG. 6, a conventional accelerator is connected to a shaft engagement 14 by an accelerator wire 23. The shaft engagement 14 is connected to a spring 21 and a shaft 11 for stopping by a first stopper 20. The shaft 11 has a throttle valve 12 attached to the shaft 11 by bolts 13. Therefore, upon depressing an accelerator pedal 30, the throttle valve 12 is in an open position. The spring 21 and first stopper 20 are supported on a base plate 25. However, for example, such a developed vehicle safety system is shown in U.S. Pat. No. 5,193,640 to Lee. In this patent publication, an excessive pressure on the accelerator pedal is exploited to reduce the engine speed and/or to apply the brake so that the accelerator acts as a brake when the driver mistakes it for the brake. Another fixed pivot single pedal accelerator and brake control mechanism is shown in U.S. Pat. No. 4,273,211 to Sarmiento wherein toe pressure actuates the gas control rod of the vehicle, while heel pressure operates the brake control rod of the vehicle, thus greatly resembling the usual action of the foot, except it remains on the single pedal instead of having to move from one pedal to the other. However, these systems are complicated in structure, difficult to use, and expensive to manufacture.

SUMMARY OF THE INVENTION

Accordingly, it is an object of the present invention to provide a vehicle safety system for correcting simultaneous actuation of the brake and accelerator pedals which eliminates the above problems encountered with conventional vehicle safety systems.

Another object of the present invention is to provide a vehicle safety apparatus which includes a linkage operatively connected to an accelerator pedal, the linkage having a throttle valve attached to a central shaft for operating by rotation of the central shaft through the accelerator pedal, a shaft engagement attached to the central shaft, a tube rotatably containing the central shaft and connected to a brake pedal, and a tube engagement attached to the tube for operatively engaging with the shaft engagement whereby the accelerator only operates when the brake is not actuated.

A further object of the present invention is to provide to an improved vehicle safety system, which is simple in structure, easy to replace, inexpensive to manufacture, and durable in use.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a vehicle safety system which includes a linkage having a central shaft rotatably disposed within a tube at the upper portion and containing a throttle valve at the lower portion thereof, the central shaft having a shaft engagement and connected to an accelerator pedal, the tube having a tube engagement for operatively engaging with the shaft engagement connected to a brake pedal whereby upon depressing the accelerator pedal, the throttle valve opens due to the shaft engagement engaged with the tube engagement, and upon depressing the accelerator pedal and simultaneously applying the brake pedal, the throttle valve does not work due to the shaft engagement being disengaged from the tube engagement, so that even if the accelerator is misapplied in an accident situation, the accelerator does not work.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
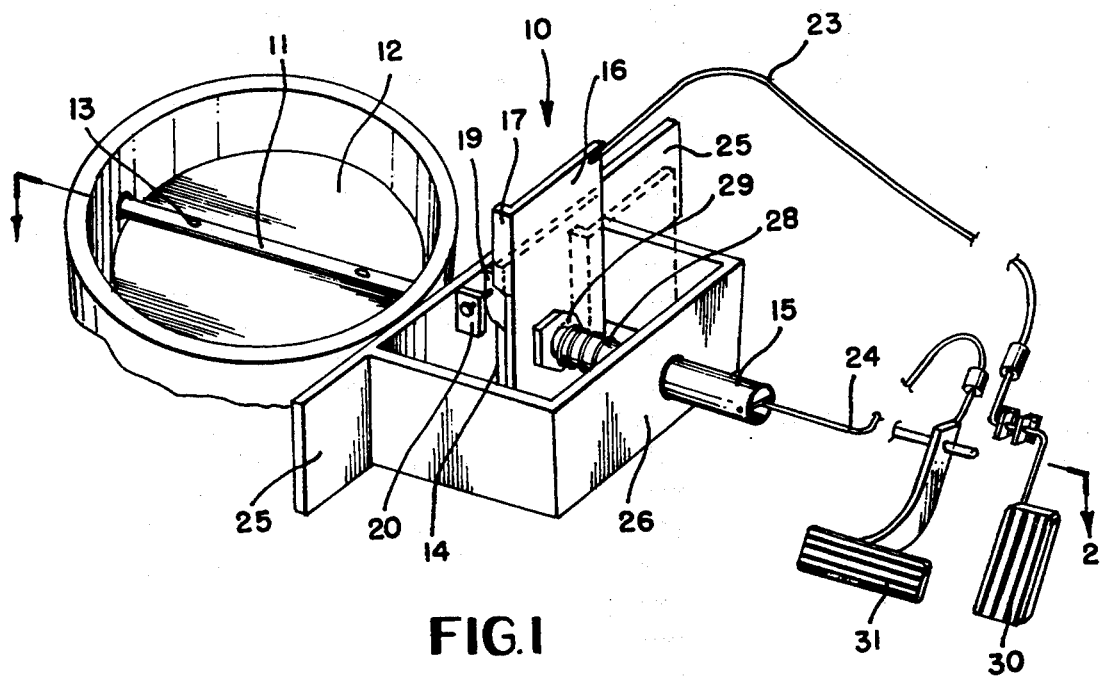
FIG. 1 is a perspective view of the vehicle safety system according to the present invention.
Figure 2:
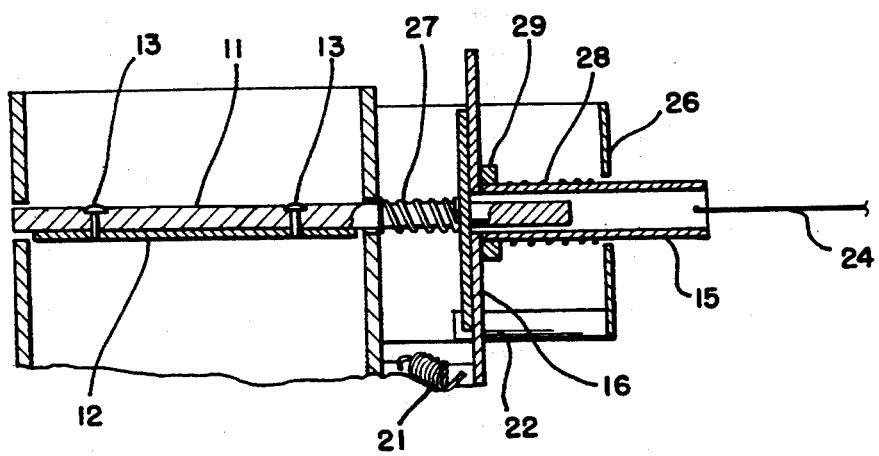
FIG. 2 is a sectional view of FIG. 1, taken along line 2—2.
Figure 3:
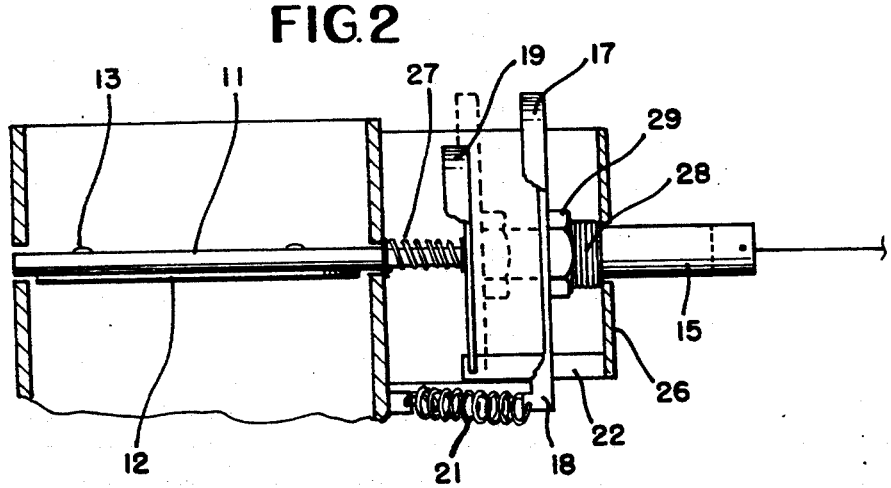
FIG. 3 is a right side elevational view of the vehicle safety system according to the present invention containing a cut-away thereof in order to illustrate a shaft engagement and a tube engagement of the present invention during the brake pedal's application.

Referring now in detail to the drawings for the purpose of illustrating preferred embodiments of the present invention, the vehicle safety system for correcting simultaneous actuation of the accelerator and brake pedals as shown in FIGS. 1, 2, and 3, comprises a linkage device 10, an accelerator pedal 30, and a brake pedal 31. The linkage device 10 generally includes upper, lower, inner and ends or surfaces and left and right sides when viewed in FIG. 1, with the accelerator pedal 30 constituting an innermost end thereof.

The linkage device 10 includes a rotatable shaft 11, a throttle valve 12 attached to the rotatable shaft 11 through bolts 13 at the lower surface thereof, a shaft engagement 14 attached to the rotatable shaft 11 at the upper surface thereof, a tube 15 for rotatably receiving an end portion of rotatable shaft 11, and a tube engagement 16 attached to the tube 15.

Figure 4:
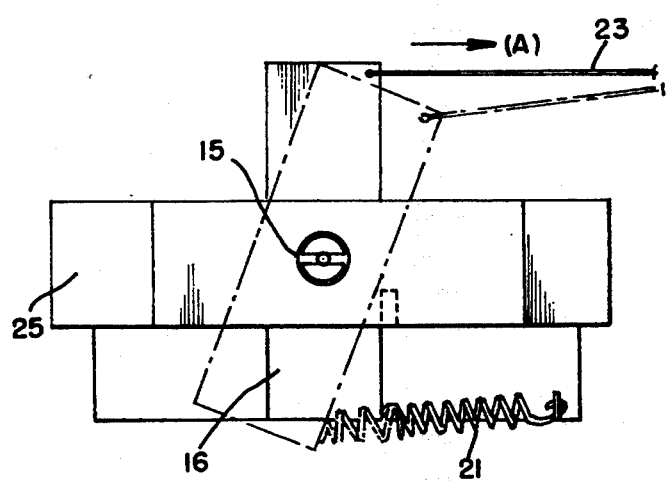
FIG. 4 is a top plan view of the vehicle safety system according to the present invention, showing a throttle valve in an open position without the brake pedal's application.

The tube engagement 16 includes a first tube extension 17 extending from a front right side portion and a second tube extension 18 extending from a rear left portion thereof. The shaft engagement 14 includes a shaft extension 19 extending from the front right side portion thereof for stopping by a first stopper 20 and engaging with the first tube extension 17. The second tube extension 18 is connected to a spring 21 for stopping by a second stopper 22. An accelerator wire 23 is connected to the front left side portion of the tube engagement 16 and the opposite side portion of the first tube extension 17 (FIG. 4).

Figure 5:
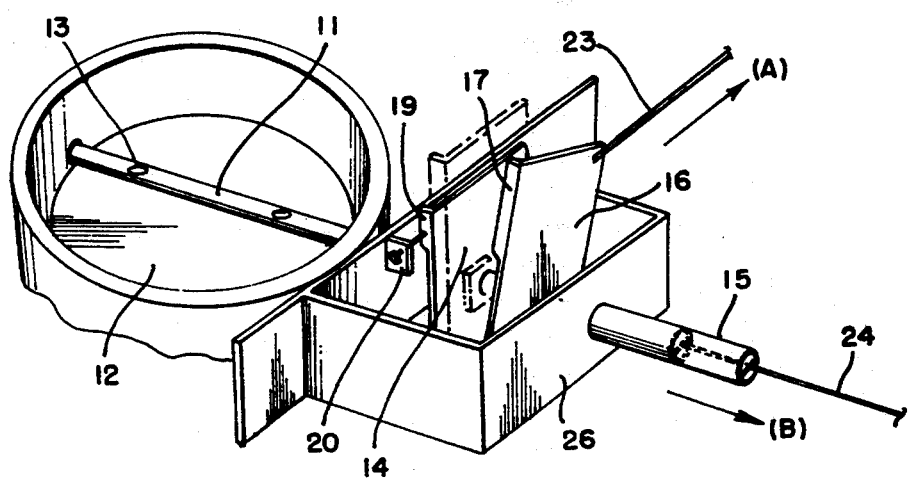
FIG. 5 is a front elevational view of the vehicle safety system according to the present invention, showing the throttle valve in a closed position when the accelerator and brake pedals are applied by the vehicle driver simultaneously.
Figure 6:
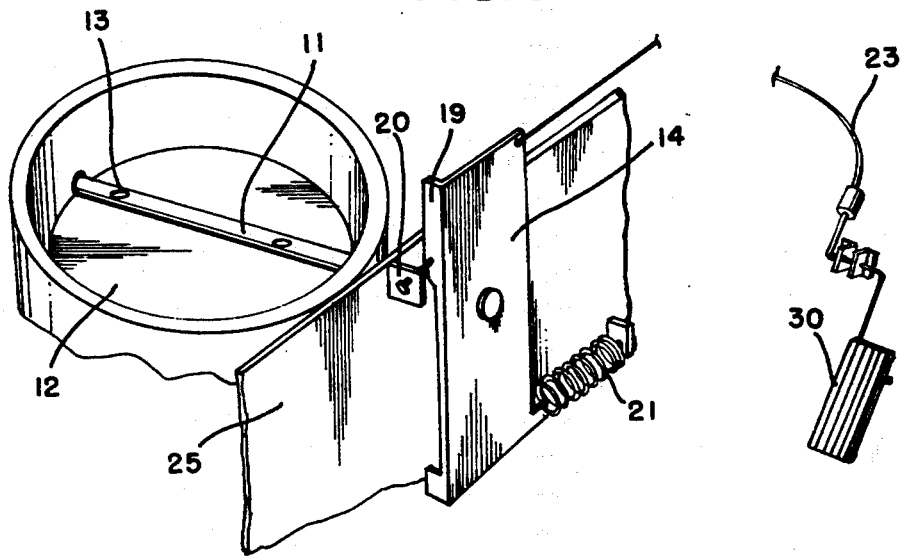
FIG. 6 is a front view of a conventional vehicle safety apparatus including a shaft engagement connected to an accelerator pedal.

As shown in FIGS. 1 and 5, the shaft and tube engagements 14 and 16 are disposed within a housing 26 supported on a base plate 25. The spring 21 is attached to the base plate 25 at one end thereof and the other end thereof is attached to the tube engagement 16. Also, the first stopper 20 is supported on the bottom of the housing 26, and the second stopper 22 is supported by the upper of the housing 26 (FIG. 4). The shaft 11 has a shaft spring 27 and the tube 15 has a tube spring 28 and a washer 29 for effectively operating each other.

The vehicle safety system according to the present invention operates as follows. As shown in FIG. 4, when the brake pedal 31 is not applied, and the accelerator pedal 30 is depressed by a vehicle driver in the direction indicated by arrow (A), the throttle valve is in an open position and the vehicle works (not shown). However, at this time, when the brake pedal 31 is applied by the vehicle driver in the direction by arrow (B) as shown in FIG. 5, the tube engagement 16 is separated from the shaft engagement 14 so that the shaft 11 is not rotated, or if rotated, is released, and the throttle valve is in a closed position. In turn, when the brake pedal is released, the tube engagement 16 is tightly engaged with the shaft engagement 14 by force of the spring 21.

On the other hand, when the vehicle driver encounters a car accident, usually the vehicle driver mistakenly depresses the accelerator pedal 30 and simultaneously depresses the brake pedal 31. However, at this time, the accelerator pedal 30 will not actuate and the vehicle will not work so that a car accident can be effectively prevented. In addition, since the throttle valve does not operate during simultaneous actuation of the brake and accelerator pedals, the vehicle fuel can be saved compared with the conventional vehicle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle safety system for correcting simultaneous actuation of accelerator and brake pedals in motor vehicles, said vehicle safety system comprising:
   a linkage for use in a carburetor in the motor vehicles, an accelerator pedal, and a brake pedal, said linkage including,
   a housing having at least upper and lower ends,
   a throttle valve attached to a first end of a rotatable shaft by bolts,
   a tube for slidably and coaxially receiving said rotatable shaft, said tube being connected to said brake pedal by a tube wire,
   a shaft engagement member attached adjacent to a second end of said rotatable shaft, the shaft engagement member having a shaft engagement extension extending perpendicularly from a first side thereof,
   a tube engagement member attached to said tube and selectively engageable with said shaft engagement member, said tube engagement being linearly movable on and axially rotatable about said rotatable shaft and further having a first tube extension extending perpendicularly from a first side thereof for mating with said shaft engagement extension and a second tube extension extending perpendicularly from a second side thereof for connecting to a spring supported adjacent the lower end of said housing, an accelerator wire being connected to said tube engagement member at a side opposing the first tube extension, wherein the perpendicularly extending first and second tube extensions are such that said first shaft engagement member fits therebetween,
   a first stopper supported in a base of said housing for stopping axial rotation of said shaft engagement member at said shaft engagement extension and a second stopper supported on an upper portion and extending to an interior of said housing for stopping said tube engagement member at said tube engagement extension, whereby upon applying the brake pedal and simultaneously depressing the accelerator pedal, said tube engagement member is linearly pulled out of engagement with said shaft engagement member, thereby releasing rotation of said shaft engagement member such that the throttle valve deactivates and in turn, without application of the brake pedal, the throttle valve is actuated by depressing the accelerator pedal, so that the vehicle safety system can effectively prevent unintended acceleration of motor vehicles.

2. The vehicle safety system of claim 1, wherein said rotatable shaft has a shaft spring, and said tube has a tube spring and a washer for effectively operating each other.

* * * * *